(12) United States Patent
Vairo

(10) Patent No.: US 8,598,247 B2
(45) Date of Patent: Dec. 3, 2013

(54) POLYURETHANE ELASTOMERS FROM RENEWABLE RESOURCES

(75) Inventor: Giuseppe Vairo, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/937,410

(22) PCT Filed: Apr. 16, 2009

(86) PCT No.: PCT/US2009/040814
§ 371 (c)(1),
(2), (4) Date: Oct. 12, 2010

(87) PCT Pub. No.: WO2009/129393
PCT Pub. Date: Oct. 22, 2009

(65) Prior Publication Data
US 2011/0039968 A1   Feb. 17, 2011

Related U.S. Application Data

(60) Provisional application No. 61/045,658, filed on Apr. 17, 2008.

(51) Int. Cl.
*C08G 18/00* (2006.01)

(52) U.S. Cl.
USPC ............ 521/159; 521/155; 521/170; 521/172

(58) Field of Classification Search
USPC .................................. 521/170, 172, 155, 159
See application file for complete search history.

(56) References Cited

U.S. PATENT DOCUMENTS

| | | | |
|---|---|---|---|
| 3,428,708 A | 2/1969 | Kuryla | |
| 4,148,840 A | 4/1979 | Shah | |
| 4,182,825 A | 1/1980 | Jackle | |
| 4,294,951 A | 10/1981 | Sugita et al. | |
| 4,390,645 A | 6/1983 | Hoffman et al. | |
| 4,423,162 A * | 12/1983 | Peerman et al. | 521/164 |
| 4,495,081 A | 1/1985 | Vanderhider et al. | |
| 4,496,487 A * | 1/1985 | Peerman et al. | 554/213 |
| 4,534,907 A * | 8/1985 | Peerman et al. | 554/213 |
| 4,543,369 A | 9/1985 | Peerman et al. | |
| 4,555,562 A | 11/1985 | Lee et al. | |
| 4,570,270 A * | 2/1986 | Oechsle, III | 128/898 |
| 4,574,137 A | 3/1986 | Serratelli et al. | |
| 4,633,021 A | 12/1986 | Hanes | |
| 4,934,579 A | 6/1990 | Doble | |
| 5,290,343 A | 3/1994 | Morita et al. | |
| 5,418,296 A | 5/1995 | Willis et al. | |
| 5,476,969 A | 12/1995 | Hinz et al. | |
| 5,482,979 A | 1/1996 | Sanders et al. | |
| 5,494,941 A * | 2/1996 | Lutter et al. | 521/159 |
| 5,672,636 A | 9/1997 | Horn et al. | |
| 5,789,451 A | 8/1998 | Guidetti et al. | |
| 6,316,662 B1 | 11/2001 | Woo et al. | |
| 6,326,412 B1 | 12/2001 | Weber et al. | |
| 6,686,435 B1 | 2/2004 | Petrovic et al. | |
| 7,960,444 B2 | 6/2011 | Lysenko et al. | |
| 2005/0124711 A1* | 6/2005 | Cameron et al. | 521/155 |
| 2006/0293400 A1* | 12/2006 | Wiltz, Jr. et al. | 521/172 |
| 2008/0096995 A1* | 4/2008 | Bedri et al. | 521/160 |
| 2008/0097044 A1* | 4/2008 | Bhattacharjee et al. | 525/454 |
| 2010/0266799 A1* | 10/2010 | Koonce et al. | 428/36.9 |
| 2010/0280187 A1* | 11/2010 | Goldhawk et al. | 525/454 |
| 2011/0015292 A1* | 1/2011 | Radhakrishnan et al. | 521/170 |

FOREIGN PATENT DOCUMENTS

| | | |
|---|---|---|
| GB | 2203425 A | 10/1988 |
| WO | WO-01/58976 A1 | 8/2001 |
| WO | WO-03/070801 A1 | 8/2003 |
| WO | WO-2004/074343 A1 | 9/2004 |
| WO | WO-2006/047434 A1 | 5/2006 |
| WO | WO-2006047434 A1 * | 5/2006 |
| WO | WO-2007/137105 A1 | 11/2007 |

OTHER PUBLICATIONS

PCT/US2009/040814 International Preliminary Report on Patentability.
PCT/US2009/040814 International Search Report.
PCT/US2009/040814 Written Opinion.

* cited by examiner

*Primary Examiner* — Melissa Rioja
(74) *Attorney, Agent, or Firm* — Whyte Hirschboeck Dudek S.C.

(57) ABSTRACT

A process is disclosed for preparing a elastomer by contacting under reaction conditions: a) an isocyanate component comprising an isocyanate-terminated prepolymer having an isocyanate (NCO) content of 10 to 30 weight percent where the prepolymer is the reaction product of a stoichiometric excess of one or more di- or poly-isocyanate compounds, collectively referred to hereinafter as isocyanate component, with a first polyol component; b) a second polyol component; and c) an effective amount of a blowing agent to provide a polyurethane elastomer with a density of from 200 to 1200 kg/m$^3$; wherein a) and b) are used at an isocyanate index of from 85 to 115, and at least one of the first polyol composition and the second polyol composition contains at least one hydroxymethyl-containing polyester polyol.

17 Claims, No Drawings

POLYURETHANE ELASTOMERS FROM RENEWABLE RESOURCES

CROSS-REFERENCE TO RELATED APPLICATIONS

This application claims benefit of U.S. Provisional Patent Application Ser. No. 61/045,658, filed Apr. 17, 2008, entitled "POLYURETHANE ELASTOMERS FROM RENEWABLE RESOURCES" which is herein incorporated by reference.

BACKGROUND

Field of the Invention

Embodiments of the invention relates to polyurethanes made from polyols prepared from renewable resources. Processes of making such polyurethanes and products comprising the polyurethanes are included. Preferably, at least one polyol has at least one hydroxymethyl group.

Dimer fatty acids or dimer fatty diols have been used to make certain microcellular elastomers, reported to be useful in shoe soles in WO2003/1070801. A polyester polyol based on dimer fatty acids or alcohols is used, which polyol or alcohol will be referred to herein as a dimerate polyol, and the polyurethanes using such a polyol or alcohol as dimerate polyurethanes.

The use of dimer fatty acids and diols limits the amount of renewable resource that can be used and still obtain mechanical properties such as tensile strength, tear strength, and elongation at break (TTE) suitable for such applications as shoe soles. It would be desirable to obtain at least the same TTE properties obtained with the dimerate polyols while using greater amounts of renewable resource; to obtain TTE properties better than those obtained with dimerate polyols while using at least the same amount of renewable resource; or both. Alternatively, it would be desirable to obtain TTE properties at least sufficient for the intended use which vary with foam density as specified in more detail hereinafter.

SUMMARY OF THE INVENTION

It has been found that at least some of these desirable qualities are achievable by using at least one polyester polyol formed from hydroxymethylated natural oil or derivatives thereof in a polyurethane composition comprising at least one prepolymer prepared from a first polyol component and reactive with a second polyol component. While at least one hydroxymethyl-containing polyester polyol is optionally used as at least a portion of the first or second polyol component, it is preferably present in the second polyol component regardless of its presence or absence in the first polyol component.

An embodiment of the invention includes a process for preparing a elastomer comprising a step of contacting under reaction conditions at least: (a) an isocyanate component comprising an isocyanate-terminated prepolymer having an isocyanate (NCO) content of 10 to 30 weight percent where the prepolymer is the reaction product of a stoichiometric excess of one or more di- or poly-isocyanate compounds, collectively, referred to hereinafter as isocyanate component with a first polyol composition referred to hereinafter as first polyol component; (b) a second polyol composition referred to hereinafter as second polyol component; and (c) an effective amount of a blowing agent to provide a polyurethane elastomer with a density from 200 to 1200 kg/m$^3$; wherein (a) and (b) are used at an isocyanate index of from 85 to 115, and the first polyol composition, the second polyol composition, or both, contain (are comprising) at least one hydroxymethyl-containing polyester polyol referred to hereinafter as HMPP. Materials other than (a), (b) and (c) are optionally present, such as for instance at least one catalyst, additives and the like as indicated by the terminology "at least" (a), (b) and (c).

An embodiment of the invention also includes an elastomer, preferably a microcellular elastomer, which is obtainable by contacting under reaction conditions at least: (a) an isocyanate component comprising an isocyanate terminated prepolymer having an isocyanate (NCO) content of 10 to 30 weight percent where the prepolymer is the reaction product of a stoichiometric excess of an isocyanate component with a first polyol component; (b) a second polyol component; and (c) an effective amount of a blowing agent to provide a polyurethane elastomer with a density from 200 to 1200 kg/m$^3$; wherein (a) and (b) are used at an isocyanate index of from 85 to 115, and the first polyol composition, the second polyol composition, or both, contain (are comprising) at least one hydroxymethyl-containing polyester polyol referred to hereinafter as HMPP.

In still another embodiment, an embodiment of the invention is a shoe sole comprising a polymer prepared by the processes or obtainable by using the combination of prepolymer and polyol described previously.

DETAILED DESCRIPTION OF THE INVENTION

Definition of Terms

As used herein the term "polyols" indicates those materials having at least one group containing an active hydrogen atom capable of undergoing reaction with an isocyanate. Preferred among such compounds are materials having at least two hydroxyls, primary or secondary, or at least two amines, primary or secondary, carboxylic acid, or thiol groups per molecule. Compounds having at least two hydroxyl groups or at least two amine groups per molecule are especially preferred due to their desirable reactivity with polyisocyanates.

The isocyanate-terminated polymer or quasi-prepolymer comprises a reaction product of an active hydrogen functional compound or mixture thereof and a stoichiometric excess of a polyisocyanate. The term "prepolymer" is used herein to indicate an isocyanate-terminated entity that is formed in the reaction of an active hydrogen-functional compound and a polyisocyanate. The term "quasi-prepolymer" is employed herein to indicate a prepolymer-containing mixture which also contains unreacted polyisocyanate. A quasi-prepolymer can be prepared by reacting said active hydrogen-terminated compound with an amount of a polyisocyanate greater than that needed to react with the active hydrogen groups thereon (that is, a stoichiometric excess of polyisocyanate) such that excess unreacted polyisocyanate is present in the product. Alternatively, the quasi-prepolymer can be prepared by forming a prepolymer and then mixing it with additional polyisocyanate.

The term "tear strength" refers to resistance to tearing as determined according to the procedures of DIN 53453.

The term "tensile strength" refers to the maximum force a sample can bear while being extended under linear (uniaxial) extensional force as determined according to the procedures of DIN 53543.

The term hardness refers to Shore A Hardness as measured according to the procedures of ASTM 53505.

The term abrasion resistance refers to resistance to abrasion as measured according to the procedures of DIN 53516.

The term "elastomer" is used herein to refer to a polymer which exhibits tensile elongation at break of advantageously at least about 200, preferably at least about 220, more preferably at least about 240, most preferably at least about 260 and preferably at most about 2000, more preferably at most about 1700, and, in some embodiments, most preferably at most about 1500 percent as measured by the procedures of DIN 53543.

As used herein, the term "microcellular" is intended to designate cell structure which appears to be essentially solid to the unassisted eye. The average diameter (cell size) of the microcells will often vary from about 0.1 mm or less to about 0.2 mm or somewhat higher, depending on choice of cell control agents, mold temperature, mold pressure, catalyst and reactivity of the reaction components among other factors as will be appreciated by those skilled in the art. The term is inclusive of materials having an average cell size above 0, preferably at least about 0.1, and independently preferably at most about 800 microns, more preferably at most about 400 microns, and most preferably at most about 100 microns. The average cell size or pore size (diameter) for the microcellular foams is determined according to ASTM D3576-77 except that measurement is taken from an enlarged photograph obtained by scanning electron microscopy instead of measurement taken directly from the foam.

As used herein, the terms "cell," "cavity," "void," and "bubble" each refer to a region within a material that is not filled by that material. The "cell" may contain another material or is optionally a void, but preferably the cell contains a gas, typically air.

The term "TTE" refers to tensile, tear, elongation as measured by the tests previously described.

The term "density" is used herein to refer to weight per unit volume of a foam. In the case of polyurethane foams, the density is determined according to the procedures of ISO 845.

The term "dimer fatty acid" is used herein to designate products having the dimerization product of one or more mono- or poly-unsaturated fatty acids as the principal constituent thereof. Dimer fatty acids are well known in the polymer art. They typically exist as mixtures. For example, dimer fatty acids normally contain a percentage of trimer fatty acids and a relatively small percentage of monofunctional fatty acids. Dimer fatty acids are those containing from about 10 to about 20 mole percent of trimer fatty acids. GB-2203425-A is directed to dimerized fatty acids and describes forming polyesters using such dimerized fatty acids. The polyesters produced according to the teaching of GB-2203425-A are homo polyesters or random copolyesters.

The term "dimer fatty acid diol" "dimer fatty diol" or "dimer diol" is used herein to designate a diol prepared from at least one dimer fatty acid or derivative thereof, preferably from the acid or ester or a combination thereof.

The term "polyether polyol" is used herein to designate a reaction product of an initiator and at least one alkylene oxide, for instance ethylene oxide (EO), propylene oxide (PO), butylene oxide (BO) and the like or combination thereof, where the combination is optionally sequential or simultaneous.

The term "natural oil" is used herein to refer to animal and vegetable oils, preferably vegetable oils. Examples of vegetable and animal oils include, but are not limited to, castor oil, soybean oil, safflower oil, linseed oil, corn oil, sunflower oil, olive oil, canola oil, sesame oil, cottonseed oil, palm oil, rapeseed oil, tung oil, fish oil, or a blend of any of these oils. For purposes of the embodiments of the invention, petroleum or mineral oils are distinguished from natural oils.

The term "natural oil or derivative thereof" is used herein to refer to a natural oil as previously discussed or any substance, compound or combination thereof chemically or physically, preferably chemically, derivable from a natural oil. Multiple chemical reactions are optionally required.

The term "renewable resource" is used herein to refer to annually renewable resources such as compounds of animal and plant origin as distinguished from, for instance, petroleum or mineral oils and derivatives.

The terms "natural oil content," "weight contribution of renewable resource," "renewable resource content," "renewable content" "renewable" "level of renewable resource" and "weight contribution from natural oil" all refer to that weight percentage of the subject matter derived from plant or animal oil or fat as its origin. For instance, if a vegetable oil with a molecular weight of 1000 and having 3 hydroxyl groups is reacted with a trifunctional polyether polyol molecule of other than plant or animal oil origin with a molecular weight of 290 to make a triol, with removal of glycerin which has a molecular weight of 90, the weight contribution of renewable resource is $(1000-90)/(1000-90+290)=76$ percent.

The term "natural oil polyol" (hereinafter NOP) is used herein to refer to compounds having hydroxyl groups which compounds are isolated from, derived from or manufactured from natural oils, including animal and vegetable oils, preferably vegetable oils. Examples of vegetable and animal oils that are optionally used include, but are not limited to, soybean oil, safflower oil, linseed oil, corn oil, sunflower oil, olive oil, canola oil, sesame oil, cottonseed oil, palm oil, rapeseed oil, tung oil, fish oil, or a blend of any of these oils. Alternatively, any partially hydrogenated or epoxidized natural oil or genetically modified natural oil can be used to obtain the desired hydroxyl content. Examples of such oils include, but are not limited to, high oleic safflower oil, high oleic soybean oil, high oleic peanut oil, high oleic sunflower oil (such as NuSun sunflower oil), high oleic canola oil, and high erucic rapeseed oil (such as Crumbe oil). Natural oil polyols are well within the knowledge of those skilled in the art, for instance as disclosed in Colvin et al., UTECH Asia, *Low Cost Polyols from Natural Oils*, Paper 36, 1995 and "Renewable raw materials—an important basis for urethane chemistry:" *Urethane Technology*: vol. 14, No. 2, April/May 1997, Crain Communications 1997, WO 2001/04225, WO 2004/096882; WO 2004/096883; U.S. Pat. No. 6,686,435, U.S. Pat. No. 6,433,121, U.S. Pat. No. 4,508,853, U.S. Pat. No. 6,107,403, US Pregrant publications 2006/0041157, and 2004/0242910. For purposes of the embodiments of the invention, petroleum oils are distinguished from natural oils.

The term "natural oil based polyol" is used herein to refer to NOP compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. Such reactions are discussed in the references in the preceding paragraph.

As used herein the term "conventional polyol" is any polyol within the skill in the art commonly used in the formation of polyurethane or urea polymers. Conventional polyether polyols are formed from at least one alkylene oxide, preferably ethylene oxide, propylene oxide or a combination thereof, and not having a part of the molecule derived from a vegetable or animal oil, a polyol of the type commonly used in making polyurethane foams, particularly for the practice of the embodiments of the invention, HR (high resilience) polyurethane foams. Polyether polyols are prepared by methods within the skill in the art such as by alkoxylation of suitable starter molecules. Such a method generally involves reacting an initiator such as, water, ethylene glycol, or propylene glycol, glycerol, sorbitol or blends thereof with an alkylene oxide in the presence of a catalyst. Ethylene oxide, propylene oxide, butylene oxide, or a combination of these oxides can be particularly useful for the alkoxylation reaction. A polyether polyol, for instance polyoxyethylene polyol can contain alkyl substituents. The process for producing polyether polyols can involve a heterogeneous feed of a mixture of alkylene oxides, a sequential feed of pure or nearly pure alkylene oxide polyols to produce a polyol with blocks of single components, or a polyol which is capped with, for example, ethylene oxide or propylene oxide. Other types of conventional polyols include polyester polyols, polybutadiene polyols, polyether siloxane polyols, poly tetrahydrofuran polyols and combinations thereof. These types of polyols are all known and used in polyurethane chemistry.

As used herein, the term "polyester" refers to those polymers produced from the reaction of a hydroxyl (—OH) containing material with a polycarboxylic acid or an anhydride thereof or of at least one carboxylic acid and at least one polyfunctional alcohol, for instance, a diol, triol or other polyol which reaction product thus has more than one ester group and itself has an average of more than one hydroxyl group. The majority of the recurring units in a polyester polyol, thus, contain ester linkages. Conventional polyester polyols are formed from materials of mineral or petroleum origin and include polylactones and butanediol/adipate polyesters. The term includes compositions which are essentially as described but may include some minor amount of unreacted reagent, for instance, unreacted polyhydric alcohol.

The term "NCO Index" means isocyanate index, as that term is commonly used in the polyurethane art. As used herein as the equivalents of isocyanate, divided by the total equivalents of isocyanate-reactive hydrogen containing materials, multiplied by 100. Considered in another way, it is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

Hydroxymethyl-containing polyester polyols derived from at least one fatty acid, hereinafter HMPP, are used as at least a portion of the polyols in the present invention, that is, as at least a portion of the First or Second Polyol Component, or both.

The HMPP is characterized as having at least one ester group per molecule and at least one hydroxymethyl (—CH₂OH) group per molecule. The HMPP is conveniently derived from at least one hydroxymethyl-group containing fatty acid having from 12 to 26 carbon atoms, or an ester of such a hydroxymethylated fatty acid. It can be prepared by reacting the hydroxymethyl-group containing fatty acid with a polyol, hydroxylamine or polyamine initiator compound having an average of at least 1, preferably at least about 2 hydroxyl, primary amine, secondary amine groups or a combination thereof per molecule. Proportions of starting materials and reaction conditions are selected such that the resulting HMPP contains an average of at least 1.3 repeating units derived from the hydroxymethyl-group containing fatty acid or ester thereof for each hydroxyl, primary amine and secondary amine group in the initiator compound.

The HMPP advantageously has an average of at least 2, preferably at least 2.5, more preferably at least 2.8, to about 12, more preferably to about 6, even more preferably to about 5, hydroxyl, primary and secondary amine groups combined per molecule. The HMPP also suitably has an equivalent weight of at least 400, such as at least about 600, at least about 650, at least about 700, or at least about 725, and independently at most about 15,000, such as at most about 6000, at most about 3500, at most about 1700, at most about 1300, or at most about 1000. Equivalent weight is equal to the number average molecular weight of the molecule divided by the combined number of hydroxyl, primary amine and secondary amine groups.

The HMPP preferably has a structure represented by:

wherein R is the residue of an initiator compound having n hydroxyl, primary or secondary amine groups, or a combination thereof, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain containing one or more A groups, provided that the average number of A groups per molecule is greater than or equal to 1.3 times n, and each A is independently selected from the group consisting of A1, A2, A3, A4 and A5, provided that at least some A groups are A1, A2 or A3. A1 is:

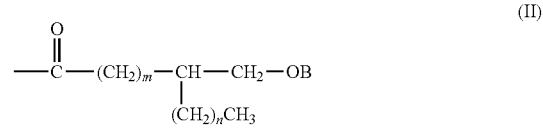

wherein B is H or a covalent bond to a carbonyl carbon atom of another A group; m is number greater than 3, n is greater than or equal to zero and m+n is at least about 8, preferably at least about 11 and independently at most about 22, preferably at most about 19. A2 is:

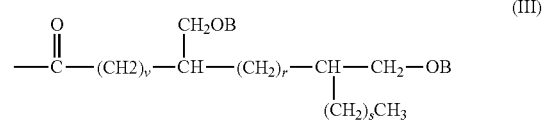

wherein B is as before, v is a number greater than 3, r and s are each numbers greater than or equal to zero with v+r+s being at least about 6, more preferably at least about 10 and independently preferably at most about 20, more preferably at most about 18. A3 is:

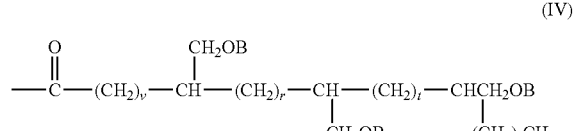

wherein B, v, each r and s are as defined before, t is a number greater than or equal to zero, and the sum of v, r, s and t is at least about 5, preferably at least about 10 and independently at most 19, preferably at most about 18. A4 is

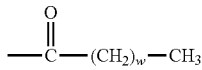 (V)

where w is from 10 to 24, and A5 is

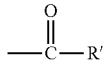 (VI)

where R' is a linear or branched alkyl group that is substituted with at least one cyclic ether group and optionally one or more hydroxyl groups or other ether groups. The cyclic ether group is optionally saturated or unsaturated and may contain other inert substitution. The hydroxyl groups are optionally on the alkyl chain or on the cyclic ether group, or both. The alkyl group optionally includes a second terminal —C(O)— or —C(O)O— group through which it optionally bonds to another initiator molecule. A5 groups, in general, include lactols, lactones, saturated or unsaturated cyclic ethers or dimers that are formed as impurities during the manufacture of the hydroxymethyl-group containing fatty acid or ester. A5 groups preferably contain 12-50 carbon atoms.

In Formula I, n is preferably at least about 2, and independently preferably at most about 8, more preferably at most about 6, most preferably from at most about 5. Each X is preferably —O—. The total average number of A groups per hydroxymethylated polyol molecule is preferably at least 1.5 times the value of n, such as preferably at least about 1.5, more preferably at least about 2, independently preferably at most about 10, more preferably at most about 5 times the value of n.

A is preferably A1, a mixture of A1 and A2, a mixture of A1 and A4, a mixture of A1, A2 and A4, a mixture of A1, A2 and A3, or a mixture of A1, A2, A3 and A4, in each case optionally containing a quantity of A5. Mixtures of A1 and A2 preferably contain A1 and A2 groups in a mole ratio of preferably at least about 10:90, more preferably at least about 60:40, and independent preferably at most about 95:5, more preferably at most about 90:10. Mixtures of A1 and A4 preferably contain A1 and A4 groups in a mole ratio of at most about 99.9:0.1, and independently preferably at least about 70:30, more preferably at least about 85:15. Mixtures of A1, A2 and A4 preferably contain at least about 10, more preferably at least about 25, and independently preferably at most about 95, more preferably at most about 70 mole percent A1 groups, preferably at least about 5, more preferably at least about 15, and independently at most about 90, more preferably at most about 40 mole percent A2 groups and up to about 30 percent A4 groups. Mixtures of A1, A2 and A3 preferably contain from 30 to 80 mole percent A1 groups, from 10 to 60 mole percent A2 groups and from 0.1 to 10 mole percent A3 groups. Mixtures of A1, A2, A3 and A4 groups preferably contain from 20 to 50 mole percent A1 groups, 1 to about 65 percent A2 groups, from 0.1 to about 10 mole percent A3 groups, and up to 30 mole percent A4 groups. Especially preferred polyester polyols for practice of the invention contain a mixture of from 20 to 50 mole percent A1 groups, from 20 to 50 mole percent A2 groups, 0.5 to 4 mole percent A3 groups and from 15 to 30 mole percent A4 groups. In all cases, A5 groups advantageously constitute from 0 to preferably at most about 7 mole percent, more preferably at most about 5 mole percent, of all A groups.

Preferred mixtures of A groups conveniently contain an average of about 0.8 to about 1.5 —CH$_2$OH—CH$_2$OB groups, or a combination thereof per A group, such as preferably at least about 0.9 or about 0.95 and independently preferably at most about 1.3 or about 1.2 —CH$_2$OH—CH$_2$OB group, or a combination thereof per A group. Such mixtures of A groups (1) allow the initiator functionality to mainly determine the polyether polyol functionality and (2) tend to form less densely branched polyester polyols.

"Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester, and the like.

HMPPs according to structure I are conveniently prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow. The vegetable or animal fat is conveniently first subjected to a transesterification reaction with a lower alkanol, especially methanol or ethanol, to produce alkyl esters of the constituent fatty acids. The resulting alkyl esters are optionally hydrolyzed to the corresponding fatty acids if desired, but this step is usually not necessary. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in WO 04/096744. Some fatty acid groups contain multiple carbon-carbon double bond sites. In such cases, the hydroformylation reaction sometimes does not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydromethylated fatty acids is then reacted with an initiator compound, with removal of water or lower alkanol to form the polyester polyol. The initiator contains two or more hydroxyl, primary amine or secondary amine groups, and can be a polyol, an alkanol amine or a polyamine. Initiators of particular interest are polyols. Polyether polyol initiators are useful, including polymers of ethylene oxide and/or propylene oxide having at least about 2 and independently preferably at most about 8, more preferably at most about 4 hydroxyl groups/molecule and a molecular weight of preferably at least about 150, more preferably at least about 200 and independently preferably at most about 3000, more preferably at most about 1000. Lower (that is, less than 400, preferably from 31 to 125) equivalent weight initiators include materials commonly used as chain extenders and crosslinkers in polyurethane formulations. These include ethylene glycol, diethylene glycol, 1,2-propylene glycol, dipropylene glycol, tripropylene glycol, cyclohexanedimethanol, ethylene diamine, phenylene diamine, bis(3-chloro-4-aminophenyl)methane, 2,-4-diamino-3,5-diethyl toluene, diethanol amine, monoethanol amine, triethanol amine, mono- di- or tri(isopropanol) amine, glycerine, trimethylol propane, pentaerythritol, and the like.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, because the hydroformylation reaction often does not take place across all the carbon-carbon double bonds unless stringent reaction conditions are used. Carbon-carbon double bonds that are not hydroformylated usually become hydrogenated. Methods of making such hydroxymethyl-containing polyester polyols are within the skill in the art such as described in WO 04/096744.

The HMPP so produced generally contains some unreacted initiator compound, and sometimes contains unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The HMPP is optionally alkoxylated, if desired, to introduce polyether chains onto one or more of the hydroxymethyl groups or functional groups attached to the residue of the initiator compound. The hydroxyl groups on the HMPP are optionally alternatively converted to amino groups, for instance using a reductive amination process within the skill in the art.

The polyurethane prepolymers used in producing the elastomers of an embodiment of the invention include a polyisocyanate component and an isocyanate reactive component also known as an active hydrogen containing material or polyol, referred to herein as first polyol component. The term polyurethane includes polymers containing linkages known to those in the art associated with the formation of a polyurethane, such as urea or polyureas, allophanate, biuret, and the like.

The polyisocyanate component of the prepolymer formulations used in an embodiment of the invention is advantageously selected from organic polyisocyanates, modified polyisocyanates, and mixtures thereof, and includes aliphatic, aromatic and cycloaliphatic isocyanates. Aromatic polyisocyanates include, for example, 2,4- and 2,6-toluenediisocyanate (TDI) and the corresponding isomeric mixtures; 4,4'-, 2,4'- and 2,2'-diphenyl-methanediisocyanate (MDI) and the corresponding isomeric mixtures; polyphenyl polymethylene polyisocyanates (PMDI); and mixtures of the forgoing. Examples of aliphatic and cycloaliphatic isocyanate compounds include 1,6-hexamethylene-diisocyanate (HDI); isophorone diisocyanate (IPDI); 1,4-tetramethylene diisocyanate; 2,4- and 2,6-hexahydrotoluene-diisocyanate, the isomeric mixtures thereof; 4,4'-, 2,2'- and 2,4'-dicyclohexyl-methanediisocyanate (H 12 MDI), the isomeric mixtures thereof; 1,3-tetramethylene xylene diisocyanate; norborane diisocyanate; and 1,3- and 1,4-bis(isocyanatomethyl)cyclohexane can also be used with the present invention. Mixtures of the aromatic, aliphatic and cycloaliphatic isocyanates are optionally used.

The polyisocyanate component of the formulations of an embodiment of the invention optionally includes so-called modified multifunctional isocyanates, that is, products which are obtained through chemical reactions of the above diisocyanates and/or polyisocyanates. Exemplary are polyisocyanates containing esters, ureas, biurets, allophanates, carbodiimides and/or uretonimines; isocyanurate and/or urethane group containing diisocyanates or polyisocyanates.

In one preferred embodiment, the isocyanate-terminated prepolymers are prepared with 4,4'-MDI, or other MDI blends containing a substantial portion of the 4,4'-isomer or MDI modified as described previously. Preferably the MDI contains 90 and more preferably greater than 95 percent by weight of the 4,4'-isomer.

To make the isocyanate terminated prepolymer, at least one such di or polyisocyanate or combination thereof (Isocyanate Component) is reacted with a First Polyol Component which, in one embodiment, preferably comprises at least one HMPP and, in all embodiments, optionally includes at least one isocyanate-reactive material other than the HMPP. These materials are referred to herein as "other isocyanate reactive materials" and include materials other than HMPPs that have isocyanate-reactive groups, including materials having one or more hydroxyl, primary amine, secondary amine, epoxide groups or a combination thereof. These other isocyanate reactive materials are optionally of various types. Other isocyanate-reactive materials having an equivalent of 400 or greater, preferably at least about 400, more preferably at least about 500, most preferably at least about 600 and independently preferably at most about 8,000, more preferably at most about 3,000, most preferably at most about 2,000 are optionally used. Examples of such higher equivalent weight materials include polyether polyols, polyester polyols, and aminated polyethers. They typically will have an average functionality (isocyanate-reactive groups/molecule) of at least about 1, more preferably at least about 1.8, and independently at most about 8, more preferably at most about 3.5. The polyethers of interest include homopolymers of propylene oxide, ethylene oxide or tetrahydrofuran, for example, and random and/or block copolymer of propylene oxide and ethylene oxide. Polyesters of interest include polylactones, ethyleneglycol/adipate and butanediol/adipate polyesters.

The other isocyanate reactive material is advantageously selected from polyether polyols, polyester polyols, polylactone polyols, polycarbonate polyols, polybutadiene polyols, and natural oil polyols. Examples of these and other suitable isocyanate-reactive materials are described more fully in U.S. Pat. No. 4,394,491. Alternative polyols that are optionally used include polyalkylene carbonate-based polyols. In one embodiment, the polyester polyol contains 1,3-/1,-4-CHDM as at least a portion of the polyol component as is within the skill in the art and taught in WO2007/137105 which is incorporated herein to the fullest extent permitted by law.

The polyester, or other polyol used in making the prepolymer or in the second polyol component, advantageously has an equivalent weight per hydroxyl group of preferably of at least about 250, more preferably of at least about 300, most preferably at least about 500 and independently preferably at most about 2000, more preferably at most about 1500, most preferably at most about 1300. Such polyester polyols are conveniently obtained by reaction of a polycarboxylic acid (or derivative, such as ester or anhydride) with polyhydroxy compound. Suitable polycarboxylic acids optionally have two or more carboxylic acid groups or an equivalent number of anhydride groups on the basis that one anhydride group is equivalent to two acid groups. Such polycarboxylic acids are well within the skill in the art. For the purpose of the embodiments of the invention, preferably the polycarboxylic acid contains two carboxylic acid groups. Examples of suitable polycarboxylic acids include aliphatic dicarboxylic acids having at least 2 and preferably at most about 36, more preferably at most about 8 carbon atoms in the alkylene radical. These acids include, for example, aliphatic dicarboxylic acids such as adipic acid, glutaric acid, pimelic acid, suberic acid, azelaic acid, sebacic acid, undecanedoic acid, dodecanadioic acid, succinic or hexanedioic acid; cycloaliphatic acids such as hexahydrophthalic acid and 1,3- and 1,4-cyclohexane dicarboxylic acid; 1,3- and 1,4-unsaturated alkane dioic acids such as fumaric or maleic acids; dimer acids such (such as those available from Uniqema); and aromatic acids such as phthalic acid and terephthalic. The anhydrides of the aforementioned polybasic acids such as maleic anhydride or phthalic anhydride are also useful. A combination of two or more of the polybasic acids is also within the scope of the invention and should be understood as an alternative when the polycarboxylic acid or polybasic acid is discussed. In one embodiment, it is preferred to use glutaric acid, succinic acid, adipic acid or a combination thereof.

Polyhydroxy compounds reactive with the polycarboxylic acid to form a polyester are exemplified by dihydric to octohydric alcohols. Examples of di- and multifunctional alcohols include ethylene glycol, diethylene glycol, propylene glycol, dipropylene glycol, 1,3-propanediol, 1,4-butanediol, 1,6-hexanediol, 1,10-decanediol, 1,3-/1,4-cyclohexanedimethanol (CHDM), glycerine and trimethylolpropane and combinations thereof. If trifunctional or higher alcohols are used for the manufacture of the polyester polyols, for the production of elastomer for shoe soles, their amount is generally chosen such that the average functionality of a blend is preferably at least about 2 and independently preferably at most about 2.8, more preferably at most about 2.3.

Suitable polyether polyols include those having a nominal functionality of from 2 to 8, preferably 2 to 6. Such polyether polyols are conveniently obtained by reaction of an active hydrogen-containing initiator with a quantity of one or more alkylene oxides to give a product of desired hydroxyl nature and equivalent weight. In most instances, such alkylene oxides are C2 to C4 alkylene oxides and include butylenes oxide, ethylene oxide and propylene oxide or a mixture thereof. Exemplary initiators for polyether polyols include, for example, ethanediol, 1,2- and 1,3-propanediol, diethylene glycol, dipropylene glycol, tripropyleneglycol; polyethyleneglycol, polypropylene glycol; 1,4-butanediol, 1,6-hexanediol, glycerol, pentaerythritol, sorbitol, sucrose, neopentylglycol; 1,2-propylene glycol; trimethylolpropane glycerol; 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0 2' 6]decene; Dimerol alcohol (a 36 carbon diol commercially available from Henkel Corporation or Uniqema); hydrogenated bisphenol; 9,9(10,10)-bishydroxymethyloctadecanol; 1,2,6-hexanetriol; and combination thereof. Other initiators for polyether polyols include linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole. Catalysis for production of polyether polyols are optionally anionic or cationic, such as KOH, CsOH, boron trifluoride, a double metal cyanide complex (DMC) catalyst such as zinc hexacyanocobaltate or quaternary phosphazenium compound.

Polylactone polyols are optionally used and, in most instances, have 2, 3 or 4 hydroxyl groups. Such polyols are prepared by the reaction of a lactone monomer; illustrative of which is δ-valerolactone, ε-caprolactone, ε-methyl-ε-caprolactone, ξ-enantholactone, and the like; with an initiator that has active hydrogen-containing groups; illustrative of which is ethylene glycol, diethylene glycol, propanediols, 1,4-butanediol, 1,6-hexanediol, trimethylolpropane, and the like. The production of such polyols is known in the art; see, for example, U.S. Pat. Nos. 3,169,945, 3,248,417, 3,021,309 to 3,021,317. The preferred lactone polyols are the di-, tri-, and tetra-hydroxy I functional ε-caprolactone polyols known as polycaprolactone polyols.

The polyfunctional polycarbonate polyol useful in the practice of an embodiment of the invention is obtained by reacting polyhydric alcohols which are within the skill in the art with a carbonyl component selected from the group consisting of phosgene, a chloroformate, a dialkylcarbonate, a diarylcarbonate (preferably diethylcarbonate), an alkylene carbonate and a mixture thereof. Some of the more useful polycarbonate polyols are commercially available, such as diol polycarbonates commercially available from Polimeri Europa S.p.A. under the trade designation Ravecarb™. The process for producing the polycarbonate polyol is well within the skill in the art, for example as taught by such patents as U.S. Pat. Nos. 3,689,462, 4,533,729 and 3,689,609.

Polybutadiene polyols are polybutadienes containing OH groups. Some of the preferred polybutadiene polyols optionally used in the practice of the embodiments of the invention are commercially available, such as hydroxyl terminated or hydroxylated polybutadienes commercially available from Sartomer Company under the trade designation Krasol™. Such polyols are optionally prepared anionically such as described in U.S. Pat. Nos. 5,376,745, 5,391,663, 5,393,843, 5,405,911, and 5,416,168. Polymerization of the polybutadiene diol optionally starts with a monolithium or dilithium initiator which builds a living polymer backbone at each lithium site, preferably in solution of an organic, preferably hydrocarbon solvent. The molar ratio of initiator to monomer determines the molecular weight of the polymer. The anionic polymerization of butadiene in a hydrocarbon solvent like cyclohexane is typically controlled with structure modifiers such as diethylether or glyme (1,2-diethoxy-ethane) to obtain the desired amount of 1,2-addition. Anionic polymerization is terminated, for instance, by addition of a functionalizing agent like those disclosed in U.S. Pat. Nos. 5,391,637, 5,393, 843, and 5,418,296, but preferably the living polymer is capped with ethylene oxide, prior to termination. Alternatively, a polybutadiene polyol is optionally made using a mono-lithium initiator which contains a hydroxyl group which has been blocked as the silyl ether (as disclosed in U.S. Pat. Nos. 5,376,745 and 5,416,168). Each mole of living polymer is then capped with one mole of ethylene oxide and terminated with one mole of methanol to yield the monohydroxy polybutadiene polymer. The silyl ether is then removed by acid catalyzed cleavage in the presence of water yielding the desired polybutadiene polyol.

Either or both polyol components used in the invention optionally include at least one additional natural oil polyol alone, in addition to the HMPP, in addition to at least one other isocyanate reactive material described herein or a combination thereof. The additional natural oil polyol is included in the general term other isocyanate reactive material herein unless stated otherwise or apparent from context such as in the preceding sentence. The additional natural oil polyol is suitably any natural oil derivative which is not an HMPP and is a compound that those skilled in the art can use according to the practice of the invention to produce a polyurethane elastomer. These include, for instance, the natural oil polyols disclosed in such references as Grosch, G. H. et. al., WO2000/014045(A1) (Mar. 16, 2000); David M. Casper, US2006/0041155(A1), Aug. 23, 2004; David M. Casper and Trevor Newbold, US2006/0041156(A1); Ashvin Shah and Tilak Shah, WO2001/004225(A1), (Jul. 12, 2000), Ron Herrington and Jeffrey Malsam, US2005/0070620(A1), (Jun. 25, 2004). Dwight E. Peerman and Edgar R. Rogier, EP106491 (Sep. 6, 1983); U.S. Pat. No. 4,496,487 (Sep. 7, 1982); U.S. Pat. No. 4,423,162 (Dec. 27, 1983); and U.S. Pat. No. 4,543,369 (Oct. 26, 1984); Zoran S. Petrovic et al.; US2006/0041157(A1), (Jun. 24, 2005); which teach reaction products of epoxidized soybean oil with alcohols such as methanol, ethanol, and the like, or the reaction products of alkylene oxides such as ethylene oxide (EO), propylene oxide, and the like with castor oil. Such a polyol is referred to hereinafter as a "castor and soy epoxide product." Alkylene oxide adds preferentially to an ethoxide group from EO addition to a secondary hydroxyl of a fatty acid rather than to another secondary hydroxyl. Double metal cyanate catalysts and other catalysts within the skill in the art are used to improve the ratio of addition to the secondary alcohol groups. Such a polyol is referred to hereinafter as "secondary alcohol alkoxylation product." Optionally any of the natural oil derived polyols is alkoxylated with an epoxide, preferably an alkylene oxides, more preferably ethylene oxide or propylene to increase the molecular weight.

In one preferred embodiment the prepolymer includes at least one HMPP in the First Polyol Component. Such prepolymers are within the skill in the art such as are disclosed in WO2006/047434 which is incorporated herein by reference to the fullest extent permitted by law.

In one embodiment, at least one polyol which contains autocatalytic activity can replace a portion or all of the amine and/or organometallic catalyst generally used in the production of polyurethane foams. Alternatively, such autocatalytic polyols are optionally added to enhance the demold time. When used, such autocatalytic polyols are often part of the blend of the second polyol component. When used in this manner, they are used preferably at a level of at least about 0.05, more preferably at least about 0.1, and independently preferably at most about 10, more preferably at most about 7 weight percent of the second polyol component. Such autocatalytic polyols are disclosed in EP 539,819, in U.S. Pat. Nos. 5,672,636; 3,428,708; 5,482,979; 4,934,579 and 5,476,969 and in WO2001/058,976.

The isocyanate-terminated prepolymer for use in the present inventions is prepared by procedures within the skill in the art, such as those disclosed in U.S. Pat. Nos. 4,294,951; 4,555,562; 4,182,825 or PCT Publication WO2004/074343. In a common procedure, the components are mixed together and heated to promote reaction of the polyols and the polyisocyanate. The reaction temperature will commonly be preferably at least about 30° C., more preferably at least about 60° C., and independently preferably at most about 150° C.; more preferably at most about 100° C. The reaction is advantageously performed in a moisture-free atmosphere. An inert gas such as nitrogen, argon or the like can be used to blanket the reaction mixture. If desired, an inert solvent is optionally used during preparation of the prepolymer, although none is needed. A catalyst to promote the formation of urethane bonds is optionally used. The isocyanate is used in stoichiometric excess and reacted with the polyol component using conventional prepolymer reaction techniques to prepare prepolymers having preferably at least about 10, preferably at most about 30 weight percent free NCO groups. For producing elastomers for shoe soles, the prepolymers preferably have at least about 10, more preferably at least about 13, and most preferably at least about 16, and independently at most about 30, more preferably at most about 25 weight percent, most preferably at most about 23 free isocyanate (NCO) groups, referred to herein as NCO content.

The isocyanate-terminated prepolymer is further reacted with a Second polyol component. The second polyol component preferably comprises at least one HMPP and optionally comprises at least one other isocyanate reactive material. Isocyanate reactive materials previously described as suitable for use in the first polyol component are useful for use in the second polyol component. The second polyol component optionally also includes both chain extender and crosslinkers described hereinafter.

In addition to the polyols described herein above other polyols which are optionally used in the second polyol component include so-called polymer polyols such as described in U.S. Pat. No. 4,394,491. Among the useful polymer polyols are dispersions of polymer, especially vinyl monomers, particularly styrene/acrylonitrile copolymers, in a continuous polyether polyol, polyester polyol phase or a mixture of polyether and polyester polyols. Also useful are the polyisocyanate polyaddition (PIPA) polyols (dispersions of polyurea-polyurethane particles in a polyol) and the polyurea dispersion in polyol, such as, polyharnstoff (PHD) polyols. Such polyols are described in "Polyurethane Handbook", by G. Oertel, Hanser publishers. Copolymer polyols of the vinyl type are described in, for example, U.S. Pat. Nos. 4,390,645; 4,463,107; 4,148,840 and 4,574,137.

It is also preferable to use one or more chain extenders for the production of elastomers of the present invention. The presence of a chain extending agent enhances desirable physical properties in the resulting polymer. For purposes of the embodiments of the invention, a chain extender is a material having two isocyanate-reactive groups per molecule and an equivalent weight per isocyanate reactive group of less than 250, preferably at most about 200, more preferably at most about 125, and independently preferably at least about 31 Daltons. The isocyanate reactive groups are preferably hydroxyl, primary aliphatic or aromatic amine or secondary aliphatic or aromatic amine groups. Representative chain-extenders include polyhydric alcohols, aliphatic diamines including polyoxyalkylene diamines, aromatic diamines and mixtures thereof. The isocyanate reactive groups are preferably hydroxyl, primary aliphatic or aromatic amine or secondary aliphatic or aromatic amine groups. Representative chain extenders include ethylene glycol, diethylene glycol, 1,3-propane diol, 1,3- or 1,4-butanediol, monopropylene glycol, dipropylene glycol, 1,2- and 2,3-butylene glycol, 1,6-hexanediol, neopentylglycol, tripropylene glycol, ethylene diamine, 1,4-butylenediamine, 1,6-hexamethylenediamine, phenylene diamine, 1,5-pentanediol, 1,6-hexanediol, bis(3-chloro-4-aminophenyl)methane, 3,3'-dichloro-4,4-diaminodiphenylmethane, 4,4'-diaminodiphenylmethane, bisphenol-A; bisphenol-F, 1,3-propane di-p-aminobenzene, methylene bisorthochloroaniline (MOCA), 1,3-cyclohexandiol, 1,4-cyclohexanediol; 2,4-diamino-3,5-diethyl toluene and mixtures thereof. The 1,3- and/or 1,4-cyclohexane dimethanol may also be used as chain extenders. Preferably chain extenders include ethylene glycol, diethylene glycol, 1,3-propane diol, 1,3- or 1,4-butanediol, more preferably ethylene glycol, diethylene glycol and 1,4-butanediol. If used, chain extenders are preferably present in an amount of at least about 0.5, more preferably at least about 2, and independently preferably at most about 20, more preferably at most about 16 parts by weight per 100 parts by weight of the Second polyol component.

Crosslinkers are optionally included in the second polyol component. For purposes of the embodiments of the invention "crosslinkers" are materials having three or more isocyanate-reactive groups per molecule and an equivalent weight per isocyanate-reactive group of less than 400. Crosslinkers preferably contain at least about 3, and independently at most about 8, more preferably at most about 4 hydroxyl, primary amine or secondary amine groups per molecule and have an equivalent weight of preferably at least about 30, more preferably at least about 50 and independently preferably at most about 200, more preferably at most about 125. Examples of crosslinkers include diethanol amine, monoethanol amine, triethanol amine, mono- di- or tri(isopropanol) amine, glycerine, trimethylol propane, pentaerythritol, sorbitol and the like. The amount of crosslinker is suitably 0 or, if used, preferably at least about 0.1, more preferably at least about 0.25, and independently preferably at most about 1 part by weight, more preferably at most about 0.5 part by weight, per 100 parts by weight of second polyol component.

The elastomer is prepared in the presence of a blowing agent. The blowing agent is present in an amount effective to produce the desired density, generally in the range of 200 kg/m$^3$ to 1200 kg/m$^3$. When shoe soles consists of two or more layers, such a sole will often have a compact wear layer with a density of 800 to 1180 kg/m$^3$ and a comfort layer having a density of 300 to 600 kg/m$^3$. When water is used as the blowing agent, the amount of water is preferably at least about 0.01, more preferably at least about 0.05, and independently preferably at most about 2.0, more preferably at most about 1.5, most preferably at most about 1.0 parts per 100 parts by weight of the second polyol composition.

In addition to water, low boiling point liquids are optionally used as physical blowing agents. In most instances, such liquid is an inert organic compound that can vaporize under the influence of the reaction exotherm, advantageously with a boiling point of less than about 100° C. Exemplary organic blowing agents include halogenated hydrocarbons, for example, methylene chloride, trichlorofluoromethane, dichlorodifluoromethane, dichlorofluoromethane, dichlorotetrafluoroethane, 1,1,2-trichloro-1,2,2-trifluoroethane, 1,1,1-trichloroethane, 1,1,1-trichlorodifluoroethane, 1,1,1-trichlorofluoroethane, 1,1,1,2-tetrafluoroethane (134a), 1,1,1,3,3-pentafluorobutane (365mfc), 1,1,1,2,3,3,3-heptafluoropropane (HFA 227), 1,1,1,3,3-pentafluoropropane (245fa), methyl formate, and mixtures thereof. Mixtures of these low boiling liquids with each other and or with hydrocarbons such as, for example, pentane (cyclopentane, isopentane, n-pentane), or entrained gases such as air, nitrogen or carbon dioxide are optionally used. Hydrocarbons and entrained gases are optionally also present in the absence of low boiling liquids. Carbamates, such as disclosed in U.S. Pat. Nos. 5,789,451 and 6,316,662 and EP 1 097 954, that release carbon dioxide during the foaming process, are optionally used to provide a physical blowing agent. Often, when present, such physical blowing agents are used in an amount of preferably at least about 0.1, more preferably at least about 1, most preferably at least about 1.5, and independently at most about 10, more preferably at most about 8 and more preferably at most about 6 weight percent by total weight of the second polyol component and optional chain-extending/cross-linking agent present. A combination of water and physical blowing agents is optionally used.

Hollow microspheres filled with blowing gas or liquid with a boiling point effective to blow the composition, for instance from about 130 to 75° C. and having a thermoplastic deformable skin such as those taught in U.S. Pat. No. 5,290,343 and commercially available from Akzo Nobel are also useful.

The ratio of the isocyanate component to the second polyol component is preferably at an isocyanate index of at least about 85, more preferably at least about 90, most preferably at least about 95, and independently preferably at most about 115, more preferably at most about 110, and most preferably at most about 105. The isocyanate index is defined as 100 times the ratio of NCO groups to reactive hydrogens contained in the reaction mixture.

When preparing the polyurethane polymer according to the invention, optionally but advantageously, there are present additional additives including catalysts, surfactants, fillers, pigments, fire retardants, antioxidants, antistatic agents, or combinations thereof. The use of such additives is well-known in the art and reference is made thereto for this purpose.

Useful catalysts include the tertiary amine and organometallic compounds such as described in U.S. Pat. No. 4,495,081. When using an amine catalyst advantageously it is present in from 0.1 to 3, preferably from 0.1 to 2 and more preferably from 0.4 to 1.5 weight percent by total weight of polyol and optional chain extending agent. When the catalyst is an organometallic catalyst, advantageously it is present in from 0.001 to 0.2, preferably from 0.002 to 0.1 and more preferably from 0.01 to 0.05 weight percent by total weight of polyol and optional chain extending agent. Particularly useful catalysts include in the case of amine catalysts; triethylenediamine, bis(N,N-dimethylaminoethyl)ether and di(N,N-dimethylaminoethyl)amine and in the case of the organometallic catalysts; stannous octoate, dibutyltin dilaurate, and dibutyltin diacetate. Combinations of amine and organometallic catalysts advantageously are optionally employed.

Surfactants include the diverse silicone surfactants, preferably those which are block copolymers of a polysiloxane and a polyoxyalkylene. Exemplary of such surfactants are the products DC-193 and Q4-3667 available from Dow Corning, Tegostab™ B8950 available from Goldschmidt; and GE L6900 available from Momentive. When present, the amount of surfactants advantageously employed is from 0.05 to 3, and preferably from 0.1 to 2 percent by total weight of the polyol and optional chain extending agent. Other suitable surfactants also include non-silicone containing surfactants, such as poly (alkyleneoxides).

Pigments and fillers include for example calcium carbonate, graphite, carbon black, titanium dioxide, iron oxide, microspheres, alumina trihydrate, wollastonite, prepared glass fibers dropped or continuous, polyesters and other polymeric fibers.

The polyurethane polymer prepared according to the process of the embodiments of the invention is preferably a microcellular polyurethane polymer. Such a polymer is typically prepared by intimately mixing the reaction components at room temperature or a slightly elevated temperature for a short period and then pouring the resulting mixture into an open mold, or injecting the resulting mixture into closed mold, which in either case is heated. As it reacts, the mixture takes the shape of the mold to produce a polyurethane polymer of a predefined structure, which can then, when sufficiently cured, be removed from the mold with a minimum risk of incurring deformation greater than that permitted for its intended end application. Conditions for promoting the curing of the polymer include a mold temperature of preferably at least about 20° C., more preferably at least about 35° C., most preferably at least about 45° C. and independently preferably at most about 150° C., more preferably at most about 75° C., and most preferably at most about 70° C. Such temperatures generally permit the sufficiently cured polymer to be removed from the mold typically in from 1 to 10 minutes and more typically from 1 to 5 minutes after intimately mixing the reactants. Optimum cure conditions will depend on the particular components including catalysts and quantities used in preparing the polymer and also the size and shape of the article manufactured. The elastomers according to the invention are particularly suitable for use in applications where good energy-absorbing and fatigue properties are required and a good elastomeric behavior over a broad temperature range, for example in the automotive and footwear industry. The elastomers are useful, for instance, in in-soles, mid-soles and out-soles of shoes and boots and in steering wheels, sound insulation mats, air-filter seals and dashboard-skins.

At least one HMPP is used in the first polyol component, the second polyol component or both. The amounts of at least one HMPP used in the first and second polyol components in the practice of an embodiment of the invention is advantageously sufficient to provide at least one, preferably 2, more preferably all three of: tensile strength, tear strength, and elongation at break (TTE) which is suitable for such applications as shoe soles. For a compact material (molded density 1.0-1.2 g/cm$^3$), suitable to be used as a shoe outsole, these properties are preferably at least about 10, more preferably at least about 12, most preferably at least about 15 MPa in tensile strength as measured according to the procedure of DIN 53543; preferably at least about 7.0, more preferably at least about 7.5, most preferably at least about 8.0 N/mm in tear strength as measured according to the procedure of DIN 53543; and preferably at least about 350, more preferably at least about 400, most preferably at least about 450 percent based on original length in elongation at break as measured according to the procedure of DIN 53543. For an expanded material (molded density 0.45-0.75 g/cm$^3$), suitable to be used for outsole or midsole material, these properties are preferably at least about 3.0, more preferably at least about 4.0, most preferably at least about 5.0 MPa in tensile strength as measured according to the procedure of DIN 53543; preferably at least about 4.0, more preferably at least about 5.0, most preferably at least about 6.0 N/mm in tear strength as measured according to the procedure of DIN 53543; and preferably at least about 300, more preferably at least about 350, most preferably at least about 380 percent based on original length in elongation at break as measured according to the procedure of DIN 53543. For an expanded material (molded density 0.30-0.45 g/cm$^3$), suitable to be used for midsole or footbed material these properties are preferably at least about 2.0, more preferably at least about 2.5, most preferably at least about 3.0 MPa in tensile strength as measured according to the procedure of DIN 53543; preferably at least about 10.0, more preferably at least about 12.0, most preferably at least about 13.0 N/mm in tear strength as measured according to the procedure of ASTM D 412; and preferably at least about 150, more preferably at least about 200, most preferably at least about 250 percent based on original length in elongation at break as measured according to the procedure of DIN 53543. These measurements are preferably at least equivalent to that obtained using the same formulation and process but substituting at least one dimerate polyol for the HMPP, where the dimerate polyol and HMPP have the same average active hydrogen functionality, and average molecular weight, and same total amount of renewable content. Alternatively, the HMPP is present in an amount that provides a greater level of renewable resource than does a dimerate polyol of the same functionality and average molecular weight, when used in the same process and formulation except for substitution of the HMPP for the dimerate polyol At least one of these properties, and preferably more, with increasing preference for increasing numbers of the properties, is advantageously supplied by a total amount of HMPP or combination of HMPPs of preferably at least about 5, more preferably at least about 8, most preferably at least about 12, and independently preferably at most about 50, more preferably at most about 30, most preferably at most about 20 weight percent of the total amount of reactants, that is, isocyanate, polyols, water, chain extender, and crosslinking agent. This total amount is optionally all in the first, all in the second or in both polyol components. Preferably at least a portion of the HMPP Is in the second polyol component however. When at least one HMPP is used in the first polyol component the HMPP or combination of HMPPs is preferably present in an amount of preferably at least about 10, more preferably at least about 20, most preferably at least about 30, and independently preferably at most about 65, more preferably at most about 55, most preferably at most about 45 weight percent of the first polyol component. At least one HMPP is preferably used in the second polyol component. The HMPP or combination of HMPPs is preferably present in the second polyol component in an amount of preferably at least about 10, more preferably at least about 20, most preferably at least about 40, and independently preferably at most about 80, more preferably at most about 70, most preferably at most about 60 weight percent of the second polyol component.

Objects and advantages of the embodiments of the invention are further illustrated by the following examples. The particular materials and amounts thereof, as well as other conditions and details, recited in these examples should not be used to limit the embodiments of the invention. Rather they are illustrative of the whole invention. Unless stated otherwise all percentages, parts and ratios are by weight. Examples of the invention (Ex) are numbered while comparative samples (CS), which are not examples of the invention, are designated alphabetically.

Examples

The following materials are used in the examples:

HMPP-1 is a 2.0-functional natural oil polyol prepared using vegetable oil monomers with an average of 1.0 hydroxyls per fatty acid derived from soy oil with fatty acids in their natural abundance yielding a distribution of about 27 weight percent saturated vegetable oil monomer, about 40 weight percent mono-hydroxy vegetable oil monomer, and about 33 weight percent di-hydroxyl vegetable oil monomer. It is made by reacting these hydroxymethylated soybean fatty acid methyl esters with a mixed 1,3 and 1,4-cyclohexanedimethanol commercially available from The Dow Chemical Co. under the trade designation Unoxol™ 3,4-Diol at a 4.6:1 molar ratio, using 500 ppm stannous octoate (commercially available from City Chemical Co.) as the catalyst. The resulting polyester has a viscosity of 1500 cP at 25° C., a hydroxyl number corresponding to 74.4 mg KOH/g and a number average molecular weight near 1500. NOPO-1 has an average of approximately 2.0 hydroxyl groups/molecule.

Prepolymer A is an isocyanate terminated prepolymer of MDI and adipic acid polyester polyols (polyadipates) having a isocyanate content of 18.3 weight percent, commercially available from The Dow Chemical Company under the trade designation Voralast™ GS 795.

Prepolymer B is an isocyanate terminated prepolymer of MDI and adipic acid polyester polyols (polyadipates) having a isocyanate content of 18.0 weight percent, commercially available from The Dow Chemical Company under the trade designation Voralast™ GS 749.

Polyadipate 2000 is a polyester diol made using adipic acid, having a molecular weight of 2000 having a hydroxyl number corresponding to 56 mg KOH/g of diol, commercially available from The Dow Chemical Company under the trade designation Voralast™ GF422.

Polyadipate 2500 is a polyester diol made using adipic acid, having a molecular weight of 2000 having a hydroxyl number corresponding to 45 mg KOH/g of diol, commercially available from The Dow Chemical Company under the trade designation Voralast™ GB 346.

Dimerdiol-1 is a dimer C36 fatty acid having an acid value of 194-198 mg KOH/g, commercially available from Uniqema under the trade designation Pripol™ 1013.

Dimerdiol-2 is a dimer fatty acid containing 18-21 percent trimer fatty acid and having an acid value of 192 to 197 mg KOH/g commercially available from Uniqema under the trade designation Pripol™ 1017.

Chain Extender is ethylene glycol.

Catalyst A is triethylenediamine (TEDA) undiluted.

Catalyst B is a 33 weight percent solution of TEDA in monoethylene glycol (MEG).

Comparative Samples A and B

A polyol component is formed from: 94.5 parts by weight (pbw) of Polyadipate 2500, 4.1 pbw of Chain Extender and 1.4 pbw of Catalyst B. The polyol component is introduced into a laboratory scale pouring polyurethane machine commercially available from GUSBI Italy under the designation laboratory version of Gusbi Linear P18 machine, where 100 pbw of the polyol component at 45-50° C. (T pol) is reacted with 60 pbw of Prepolymer A at a temperature of 30-35° C. (T iso) to form several sheets of polyurethane measuring 2000× 2000×10 mm for Comparative Sample A (CS A). Then 100 pbw of the same polyol component is reacted with 60 pbw of Prepolymer B at a temperature of (T iso=30-35° C., T pol=45-50° C.) to form several sheets of polyurethane of the same size for Comparative Sample B (CS B). The sheets of both Comparative Samples are tested according to the procedures of DIN 53543 and display the properties in Table 1:

TABLE 1

Properties of Comparative Samples A and B

| Property | Unit | CS A** | CS B** |
|---|---|---|---|
| Density | g/cm$^3$ | 1.1-1.2 | 1.1-1.2 |
| Hardness | ShA* | 68 | 66 |
| Tensile strength | MPa | 22.3 | 25.5 |
| Elongation at break | Percent | 600 | 595 |
| Tear strength | N/mm | 20.2 | 15 |

*ShA is Shore A

**Comparative Samples, not examples of the invention.

Comparative Samples C, D and E

For Comparative Samples C and D, Polyester Polyol CD is prepared from Dimerdiol-1, adipic acid, diethylene glycol and ethylene glycol in a weight ratio of 40:29:15:16. For Comparative Sample E, Polyester Polyol E is prepared from Dimerdiol-2, adipic acid, diethylene glycol and ethylene glycol in a weight ratio of 40:29:15:16. In each case, the listed materials are reacted according to a purge-gas method.: The temperature is raised to at least 200° C. over a period of 4-5 hours and maintained between 200 and 230° C. for a period of 6-8 hours (until acidity level becomes lower than 1.5 mg KOH/g) while water removal is aided by sparging nitrogen through the reaction mixture. A tetrabutyltitanate catalyst in an amount of 10 ppm (of titanium) based on total weight of the final polyol yield is added when the temperature reaches 200° C.

For Comparative Sample C, a polyol component is formed from 94.5 pbw of Polyester Polyol CD, 5.2 pbw Chain Extender and 0.3 pbw of Catalyst A. For Comparative Sample D, a polyol component is formed from 47.25 pbw of Polyester Polyol CD, 47.25 pbw of Polyadipate 2000, 5.2 pbw Chain Extender and 0.3 pbw of Catalyst A. For Comparative Sample E, a polyol component is formed from 94.5 pbw of Polyester Polyol E, 5.2 pbw Chain Extender and 0.3 pbw of Catalyst A.

Each of the polyol components is reacted with Prepolymer A in an amount of 60 pbw using the procedure used for Comparative Sample A to form polyurethane sheets which are then tested by the procedure used for Comparative Samples A and B with the results listed in Table 2.

TABLE 2

Properties of Comparative Samples C, D, and E

| Property | Unit | CS C** | CS D** | CS E** |
|---|---|---|---|---|
| Density | g/cm$^3$ | 1.1-1.2 | 1.1-1.2 | 1.1-1.2 |
| Hardness | ShA* | 67 | 69 | 67 |
| Tensile strength | MPa | 9.4 | 16.6 | 7.8 |
| Elongation at break | Percent | 240 | 310 | 270 |
| Tear strength | N/mm | 10.4 | 17.1 | 15.1 |

*ShA is Shore A

**Comparative Samples, not examples of the invention.

Examples 1 and 2

For Example 1, a polyol component is prepared by admixing 75.6 pbw Polyadipate 2000, 18.9 pbw HMPP-1, 4.1 pbw Chain Extender and 1.4 pbw of Catalyst B. For Example 2, a polyol component is prepared by admixing 54.45 pbw Polyadipate 2000, 37.7 pbw HMPP-1, 4.1 pbw Chain Extender and 1.4 pbw of Catalyst B. The procedure of Comparative Sample B is repeated using the polyol components of Examples 1 and 2 in place of the polyol component of Comparative Sample B. The resulting polyurethane sheets are tested by the same procedure with the results shown in Table 3.

TABLE 3

Properties of Examples 1 and 2

| Property | Unit | Ex 1 | Ex 2 |
|---|---|---|---|
| Density | g/cm$^3$ | 1.1-1.2 | 1.1-1.2 |
| Hardness | ShA* | 62 | 60 |
| Tensile strength | MPa | 23.7 | 14.6 |
| Elongation at break | Percent | 617 | 596 |
| Tear strength | N/mm | 11.4 | 14.1 |

*ShA is Shore A.

The results in Table 3 show that the use of HMPP results in elastomeric polyurethanes having tear, tensile and elongation properties in the most preferred range.

The amount of renewable content in percentage by weight is calculated considering adipic acid not to be of renewable origin. The results are shown in Table 4 with properties from Tables 1-3.

TABLE 4

Renewable Content of Examples 1 and 2 and Comparative Samples A-E

| Property Unit | Renewable Content percentage | Tensile Strength MPa | Elongation at break Percent | Tear Strength N/mm | Abrasion resistance mg |
|---|---|---|---|---|---|
| CS A** | 0 | 22.3 | 600 | 20.2 | n.a. |
| CS B** | 0 | 25.5 | 595 | 15 | 40 |
| CS C** | 22.6 | 9.4 | 240 | 10.4 | n.a. |
| CS D** | 11.3 | 16.6 | 310 | 17.1 | n.a. |
| CS E** | 22.6 | 7.8 | 270 | 15.1 | 70 |
| EX 1 | 12.6 | 23.7 | 617 | 11.4 | n.a. |
| EX 2 | 25.2 | 14.6 | 596 | 14.1 | 36 |

**Comparative Samples, not examples of the invention.

The data in Table 4 shows that when comparative samples and Examples of similar renewable content are compared, for instance, CS D with Example 1 and CS C with Example 2, the practice of the invention results in higher tensile strength and elongation at break. Furthermore, the abrasion resistance is still very good also at high renewable content. (See EX 2 as compared with. CS B and CS E.)

Embodiments of the invention include the following:

1. A process for preparing a elastomer or polyurethane comprising contacting under reaction conditions: at least a) an isocyanate component comprising an isocyanate-terminated prepolymer having an isocyanate (NCO) content of 10 to 30 weight percent where the prepolymer is the reaction product of a stoichiometric excess of one or more di- or poly-isocyanate compounds, collectively referred to hereinafter as isocyanate component, with a first polyol composition referred to hereinafter as first polyol component; b) a second polyol composition referred to hereinafter as second polyol component; and c) an effective amount of a blowing agent to provide a polyurethane elastomer with a density of from 200 to 1200 kg/m$^3$; wherein a) and b) are used at an isocyanate index of from 85 to 115, and the first polyol composition, the second polyol composition, or both, contain (are comprising) at least one hydroxymethyl-containing polyester polyol referred to hereinafter as HMPP.

2. A composition obtainable by admixing at least (a) an isocyanate component comprising an isocyanate-terminated prepolymer having an isocyanate (NCO) content of 10 to 30 weight percent where the prepolymer is the reaction product of a stoichiometric excess of one or more di- or poly-isocyanate compounds, collectively referred to hereinafter as isocyanate component, with a first polyol composition referred to hereinafter as first polyol component; (b) a second polyol composition referred to hereinafter as second polyol component; and (c) an effective amount of a blowing agent to provide a polyurethane elastomer with a density of from 200 to 1200 kg/m$^3$; wherein (a) and (b) are used at an isocyanate index of from 85 to 115, and the first polyol composition, the second polyol composition, or both, contain (are comprising) at least one hydroxymethyl-containing polyester polyol referred to hereinafter as HMPP.

3. An elastomer or polyurethane obtainable by contacting under reaction conditions at least: (a) an isocyanate component comprising an isocyanate-terminated prepolymer having an isocyanate (NCO) content of 10 to 30 weight percent where the prepolymer is the reaction product of a stoichiometric excess of one or more di- or poly-isocyanate compounds, collectively referred to hereinafter as isocyanate component, with a first polyol composition referred to hereinafter as first polyol component; (b) a second polyol composition referred to hereinafter as second polyol component; and (c) an effective amount of a blowing agent to provide a polyurethane elastomer with a density from 200 to 1200 kg/m$^3$; wherein (a) and (b) are used at an isocyanate index of from 85 to 115, and the first polyol composition, the second polyol composition, or both, contain (are comprising) at least one hydroxymethyl-containing polyester polyol referred to hereinafter as HMPP.

4. A foam comprising at least one elastomer or polyurethane of any other embodiment or which is the product of any other embodiment.

5. The foam of any other embodiment which is a microcellular foam.

6. An article comprising at least one elastomer or polyurethane of any other embodiment or which is the product of any other embodiment.

7. The article of any other embodiment which is a shoe sole or a portion of a shoe sole.

8. A shoe sole comprising at least one elastomer or polyurethane of any other embodiment or which is the product of any other embodiment.

9. The composition, elastomer, polyurethane, article, microcellular foam or shoe sole of any other embodiment wherein the second polyol component comprises at least one HMPP.

10. The composition, elastomer, polyurethane, article, microcellular foam or shoe sole of any other embodiment wherein the HMPP has at least one ester group per molecule and at least one hydroxymethyl (—CH$_2$OH) group per molecule.

11. The composition, elastomer, polyurethane, article, microcellular foam or shoe sole of any other embodiment wherein the HMPP is derived from at least one hydroxymethyl-group containing fatty acid having from 12 to 26 carbon atoms, or an ester of such a hydroxymethylated fatty acid by reacting the hydroxymethyl-group containing fatty acid with a polyol, hydroxylamine or polyamine initiator compound having an average of at least about 1 or 2 hydroxyl, primary amine, secondary amine groups or a combination thereof per molecule, and preferably contains an average of at least 1.3 repeating units derived from the hydroxymethyl-group containing fatty acid or ester thereof for each hydroxyl, primary amine and secondary amine group in the initiator compound.

12. The composition, elastomer, polyurethane, article, microcellular foam or shoe sole of any other embodiment wherein the HMPP has an average of at least about any of 2, 2.5, 2.8, and independently at most about 12, 6, or 5, hydroxyl, primary and secondary amine groups combined per molecule.

13. The composition, elastomer, polyurethane, article, microcellular foam or shoe sole of any other embodiment wherein the HMPP has an equivalent weight of at least about 400, 600, 650, 700, or 725, and independently at most about 15,000, 6000, 3500, 1700, 1300, 1000.

14. The composition, elastomer, polyurethane, article, microcellular foam or shoe sole of any other embodiment wherein the HMPP has a structure represented by $$[H-X]_{(n-p)}-R-[X-Z]_p \qquad (I)$$

wherein R is the residue of an initiator compound having n hydroxyl, primary or secondary amine groups, or a combination thereof, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain containing one or more A groups, provided that the average number of A groups per molecule is greater than or equal to 1.3 times n, and each A is independently selected from the group consisting of A1, A2, A3, A4 and A5, provided that at least some A groups are A1, A2 or A3, where A1, A2, A3 and A4 are as defined previously in the description of the invention.

15. The composition, elastomer, polyurethane, article, microcellular foam or shoe sole of any other embodiment wherein in formula I, n is preferably at least about 2, and independently preferably at most about 8, 6, or 5.

16. The composition, elastomer, polyurethane, article, microcellular foam or shoe sole of any other embodiment wherein in formula I each X is —O—.

17. The composition, elastomer, polyurethane, article, microcellular foam or shoe sole of any other embodiment wherein in formula I the total average number of A groups per hydroxymethylated polyol molecule is at least about any of 1.5 or 2, independently at most about 10 or 5 times the value of n.

18. The composition, elastomer, polyurethane, article, microcellular foam or shoe sole of any other embodiment wherein in formula I, A preferably comprises A1, more preferably in an amount of at least about 5, 10, 15, 25, 30, 50 or 60, and independently most preferably at most about 95, 90, 80 or 70 mole percent.

19. The composition, elastomer, polyurethane, article, microcellular foam or shoe sole of any other embodiment wherein the HMPPs are prepared from vegetable or animal fats that contain one or more carbon-carbon double bonds in at least one constituent fatty acid chain, preferably from at least one of chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

20. The composition, elastomer, polyurethane, article, microcellular foam or shoe sole of any other embodiment wherein the vegetable or animal has undergone at least one transesterification reaction, hydroformylation reaction, or, more preferably both, most preferably to form a hydroxy methyl group at sites of unsaturation on the fatty acid moieties.

21. The composition, elastomer, polyurethane, article, microcellular foam or shoe sole of any other embodiment wherein the natural oil or derivative thereof is reacted with at least one initiator to form at least one HMPP, preferably the initiator is selected from at least one polyol, alkanol amine or polyamine or combination thereof, preferably a polyol, more preferably having from an average of about 2 to any of 8, 6 or 4 hydroxyl groups, independently preferably having a molecular weight of preferably at least about 150, 200 and independently preferably at most about 3000 or 1000.

22. The composition, elastomer, polyurethane, article, microcellular foam or shoe sole of any other embodiment wherein the polyisocyanate component of the prepolymer is selected from organic polyisocyanates, modified polyisocyanates, and mixtures thereof, and include aliphatic, aromatic and cycloaliphatic isocyanates, preferably aromatic polyisocyanates, most preferably comprising at least one of 2,4- and 2,6-toluenediisocyanate (TDI) and the corresponding isomeric mixtures; 4,4'-, 2,4'- and 2,2'-diphenyl-methanediisocyanate (MDI) and the corresponding isomeric mixtures; polyphenyl polymethylene polyisocyanates (PMDI); and mixtures of the forgoing, most preferably TDI or 4,4'-MDI, or other MDI blends containing a substantial portion of the 4,4'-isomer or modified MDI; preferably the MDI contains 90 or 95 percent by weight of the 4,4'-isomer.

23. The composition, elastomer, polyurethane, article, microcellular foam or shoe sole of any other embodiment wherein the First Polyol Component comprises at least one HMPP, 24. The composition, elastomer, polyurethane, article, microcellular foam or shoe sole of any other embodiment wherein the First Polyol Component comprises at least one other isocyanate reactive materials, preferably comprising at least one of polyether polyols, polylactone polyols, polycarbonate polyols, polybutadiene polyols, and natural oil polyols polyester polyols, or a combination thereof, wherein the polyester polyols preferably comprise at least one polylactone, ethyleneglycol/adipate, butanediol/adipate polyesters, or combination thereof.

25. The composition, elastomer, polyurethane, article, microcellular foam or shoe sole of any other embodiment wherein the First Polyol Component comprises polyester polyols contains 1,3- or 1-4-CHDM or, preferably a combination thereof as at least a portion of the polyol component.

26. The composition, elastomer, polyurethane, article, microcellular foam or shoe sole of any other embodiment wherein the First Polyol Component has an equivalent of at least about any of 400, 500, or 600 and independently preferably at most about any of 3000 or 2000.

27. The composition, elastomer, polyurethane, article, microcellular foam or shoe sole of any other embodiment wherein at least one of the First and Second Polyol Components has an equivalent weight per hydroxyl group of preferably of at least about any of 250, 300, or 500 and independently preferably at most about any of 2000, 1500, or 1300.

28. The composition, elastomer, polyurethane, article, microcellular foam or shoe sole of any other embodiment wherein the First Polyol Component comprises at least one polyester polyol which obtainable as the reaction product of at least one polycarboxylic acid and at least one alcohol having from about 2 to about 8 hydroxyl groups, more preferably comprising at least one of ethylene glycol, diethylene glycol, propylene glycol, dipropylene glycol, 1,3-propanediol, 1,4-butanediol, 1,6-hexanediol, 1,10-decanediol, 1,3-/1,4-cyclohexanedimethanol (CHDM), glycerine and trimethylolpropane and combinations thereof.

29. The composition, elastomer, polyurethane, article, microcellular foam or shoe sole of any other embodiment wherein at least one and preferably both of the First and Second polyol components have an average functionality at least about 2 and independently preferably at most about 2.8, or 2.3.

30. The composition, elastomer, polyurethane, article, microcellular foam or shoe sole of any other embodiment wherein at least one of the First or Second Polyol Components comprise at least one natural oil polyol other than an HMPP, preferably at least one reaction product of epoxidized soybean oil with alcohols such as methanol, ethanol, and the like, or the reaction product of alkylene oxide such as ethylene oxide (EO), propylene oxide, and the like with castor oil, reaction product of at least one natural oil or derivative thereof with an epoxide, or oxidized natural oil or derivative thereof.

31. The composition, elastomer, polyurethane, article, microcellular foam or shoe sole of any other embodiment wherein the Second polyol component comprises at least one HMPP and at least one other isocyanate reactive material.

32. The composition, elastomer, polyurethane, article, microcellular foam or shoe sole of any other embodiment wherein the Second Polyol Component comprises at least one polymer polyol.

33. The composition, elastomer, polyurethane, article, microcellular foam or shoe sole of any other embodiment wherein at least one chain extenders is used in the preparation of the reaction product, polyurethane or elastomer.

34. The composition, elastomer, polyurethane, article, microcellular foam or shoe sole of any other embodiment wherein the chain extender has an equivalent weight per isocyanate reactive group of less than 250, 200, independently more preferably at most about 125, and independently preferably at least about 31 Daltons, most preferably comprises at least one polyhydric alcohol, aliphatic diamine, including polyoxyalkylene diamines, aromatic diamines and mixtures thereof.

35. The composition, elastomer, polyurethane, article, microcellular foam or shoe sole of any other embodiment wherein the chain extender comprises at least one of ethylene glycol, diethylene glycol, 1,3-propane diol, 1,3- or, 4-butanediol, monopropylene glycol, dipropylene glycol, 1,2- and 2,3-butylene glycol, 1,6-hexanediol, neopentylglycol, tripropylene glycol, ethylene diamine, 1,4-butylenediamine, 1,6-hexamethylenediamine, phenylene diamine, 1,5-pentanediol, 1,6-hexanediol, bis(3-chloro-4-aminophenyl)methane, 3,3'-dichloro-4,4-diaminodiphenylmethane, 4,4'-diaminodiphenylmethane, bisphenol-A; bisphenol-F, 1,3-propane di-p-aminobenzene, methylene bisorthochloroaniline (MOCA), 1,3-cyclohexandiol, 1,4-cyclohexanediol; 2,4-diamino-3,5-diethyl toluene, 1,3- and/or 1,4-cyclohexane dimethanol or combination thereof; preferably ethylene glycol, diethylene glycol, 1,3-propane diol, 1,3- or 1,4-butanediol, more preferably ethylene glycol, diethylene glycol and 1,4-butanediol or a combination thereof.

36. The composition, elastomer, polyurethane, article, microcellular foam or shoe sole of any other embodiment wherein the chain extender or combination thereof is present in an amount of at least about any of 0.5, 1 or 2, and independently preferably at most about 20 or 16 parts by weight per 100 parts by weight of the Second Polyol Component.

37. The composition, elastomer, polyurethane, article, microcellular foam or shoe sole of any other embodiment wherein the Second Polyol Component comprises at least one crosslinker, having at least 3 isocyanate reactive groups and an equivalent weight of less than about 400; preferably having at most about 8, or 4 hydroxyl, primary amine or secondary amine groups per molecule, independently preferably having an equivalent weight of preferably at least about 30 or 50 and independently preferably at most about 200 or 125, most preferably comprising at least one of diethanol amine, monoethanol amine, triethanol amine, mono- di- or tri(isopropanol) amine, glycerine, trimethylol propane, pentaerythritol, sorbitol and combinations thereof.

38. The composition, elastomer, polyurethane, article, microcellular foam or shoe sole of any other embodiment wherein the crosslinker is present in an amount of at least about 0, 0.1, or 0.25, and independently preferably at most about any of 1 or 0.5 part by weight per 100 parts by weight of second polyol component.

39. The composition, elastomer, polyurethane, article, microcellular foam or shoe sole of any other embodiment wherein a blowing agent is present in an amount effective to produce the desired density, preferably a density in the range of 200 kg/m$^3$ to 1200 kg/m$^3$, which blowing agent is preferably water, more preferably in an amount of preferably at least about any of 0.01 or 0.05, and independently preferably at most about any of 2.0, 1.5, or 1.0 parts per 100 parts by weight of the second polyol composition.

40. The composition, elastomer, polyurethane, article, microcellular foam or shoe sole of any other embodiment wherein the blowing agent comprises at least one entrained gas or organic liquid, preferably which can vaporize under the influence of the reaction exotherm, advantageously with a boiling point of less than about 100° C., more preferably comprising at least one of methylene chloride, trichlorofluoromethane, dichlorodifluoromethane, dichlorofluoromethane, dichlorotetrafluoroethane, 1,1,2-trichloro-1,2,2-trifluoroethane, 1,1,1-trichloroethane, 1,1,1-trichlorodifluoroethane, 1,1,1-trichlorofluoroethane, 1,1,1,2-tetrafluoroethane (134a), 1,1,1,3,3-pentafluorobutane (365mfc), 1,1,1,2,3,3,3-heptafluropropane (HFA 227), 1,1,1,3,3-pentafluoropropane (245fa), methyl formate, pentane (cyclopentane, isopentane, n-pentane), carbamate, air, nitrogen or carbon dioxide, or a combination thereof, most preferably in an amount of preferably at least about any of 0.1, 1, or 1.5, and independently at most about any of 10, 8 or 6 weight percent by total weight of the second polyol component.

41. The composition, elastomer, polyurethane, article, microcellular foam or shoe sole of any other embodiment wherein the ratio of the isocyanate component to the second polyol component is preferably at an isocyanate index of at least about any of 85, 90, or 95, and independently preferably at most about any of 115, 110, or 105.

42. The composition, elastomer, polyurethane, article, microcellular foam or shoe sole of any other embodiment wherein an amine catalyst is used in an amount of at least about any of 0.1 or 0.4 and independently at most about any of 3, 2 or 1.5 weight percent by total weight of polyol component.

43. The composition, elastomer, polyurethane, article, microcellular foam or shoe sole of any other embodiment wherein an organometallic catalyst is used in an amount of at least about any of 0.001, 0.002 or 0.01 and independently at most about any of 0.2, 0.1 or 0.05 weight percent by total weight of polyol component.

44. The composition, elastomer, polyurethane, article, microcellular foam or shoe sole of any other embodiment wherein the process used to make a polymer includes steps of (a) intimately mixing the reaction components at room temperature or a slightly elevated temperature for a short period and then (b) pouring the resulting mixture into an open mold, or injecting the resulting mixture into a closed mold, wherein the molds are preferably heated.

45. The composition, elastomer, polyurethane, article, microcellular foam or shoe sole of any other embodiment wherein the process comprises a step (c) of heating to promote polymer curing, preferably at a temperature of at least about any of 20° C., 35° C., or 45° C. and independently preferably at most about any of 150° C., 75° C., or 70° C., more preferably for a period of at least about 1 to at most about any of 5 or 10 minutes after mixing the reactants.

46. The composition, elastomer, polyurethane, article, microcellular foam or shoe sole of any other embodiment wherein the total amount of HMPP or combination of HMPPs used is at least about any of 5, 8, or 12, and independently preferably at most about any of 50, 30 or 20 weight percent of the total amount of reactants, that is, isocyanate, polyols, water, chain extender, and crosslinking agent, whether used in the first, the second or both polyol components.

47. The composition, elastomer, polyurethane, article, microcellular foam or shoe sole of any other embodiment wherein, when at least one HMPP is used in the first polyol component, the HMPP or combination of HMPPs is preferably present in an amount of preferably at least about any of 10, 20 or 30, and independently preferably at most about any of 65, 55, or 45 weight percent of the first polyol component.

48. The composition, elastomer, polyurethane, article, microcellular foam or shoe sole of any other embodiment wherein at least one HMPP is used in the second polyol component, preferably in an amount of at least about any of 10, 20, or 40, and independently preferably at most about any of 80, 70, or 60 weight percent of the second polyol component.

49. The composition, elastomer, polyurethane, article, microcellular foam or shoe sole of any other embodiment wherein the HMPP is a reaction product of at least one fatty acid or derivative thereof and at least one dicyclohexandimethanol, preferably 1,3 dicyclohexandimethanol, i.4 dicyclohexandimethanol or most preferably a combination thereof.

50. The composition, elastomer, polyurethane, article, microcellular foam or shoe sole of any other embodiment wherein the fatty acid or derivative thereof comprises, preferably consists essentially of, most preferably consists of hydroxymethylated fatty acid methyl esters.

51. The composition, elastomer, polyurethane, article, microcellular foam or shoe sole of any other embodiment wherein the fatty acid or derivative thereof comprises, preferably consists essentially of, most preferably consists of soybean oil or derivatives thereof.

52. The composition, elastomer, polyurethane, article, microcellular foam or shoe sole of any other embodiment wherein the fatty acid or derivative thereof comprises, preferably consists essentially of, most preferably consists of fatty acids or derivatives thereof from at least one vegetable oil in the fatty acid natural abundance. For purposes of the embodiments of the invention, natural abundance includes abundance as it may be somewhat, but not intentionally, altered in the course of forming derivatives.

53. The composition, elastomer, polyurethane, article, microcellular foam or shoe sole of any of the other embodiments wherein at least one HMPP is used in the first polyol component, the second polyol component or both in an amount sufficient to provide at least one, preferably 2, more preferably 3 of tensile strength, tear strength, and elongation at break (TTE) all as measured according to the procedures of DIN53543 suitable for such applications as shoe soles; in the case of a compact material having a molded density of about 1.0-1.2 g/cm³, at least 1, preferably 2, more preferably 3 of a tensile strength of preferably at least about any of 10, 12, 15 MPa; tear strength of preferably at least about any of 7.0, 7.5, or 8.0 N/mm; or elongation of preferably at least about any of 350, 400, or 450 percent based on original length in elongation at break; in the case of an expanded material having a molded density about 0.45-0.75 g/cm³ at least 1, preferably 2, more preferably 3 of a tensile strength of preferably at least about any of 3.0, 4.0, or 5.0 MPa; a tear strength of preferably at least about any of 4.0, 5.0, or 6.0 N/mm; an elongation at break of preferably at least about any of 300, 350, or 380 percent; in the case of an expanded material having a molded density of 0.30-0.45 g/cm³ at least 1, preferably 2, more preferably 3 of a tensile strength of preferably at least about any of 2.0, 2.5, or 3.0 MPa; a tear strength of preferably at least about any of 10.0, 12.0, or 13.0 N/mm; or an elongation at break of preferably at least about any of 150, 200, or 250.

54. The composition, elastomer, polyurethane, article, microcellular foam or shoe sole of any of the other embodiments wherein at least one HMPP is used in the first polyol component, the second polyol component or both in an amount sufficient to provide a greater level of renewable resource than does a dimerate polyol of the same functionality and average molecular weight, when used in the same process and formulation except for substitution of the dimerate polyol for the HMPP or combination thereof.

What is claimed:

1. A process for preparing an elastomer including a step of contacting under reaction conditions:
    (a) an isocyanate component comprising an isocyanate-terminated prepolymer having an isocyanate (NCO) content of 10 to 30 weight percent where the isocyanate-terminated prepolymer consists of the reaction product of a stoichiometric excess of one or more di- or polyisocyanate compounds with a first polyol component;
    (b) a second polyol component;
    (c) an effective amount of a blowing agent to provide a polyurethane elastomer with a density of from 200 to 1200 kg/m³;
    (d) optionally, a chain extender; and
    (e) optionally, at least one additive selected from the group consisting of a catalyst, surfactant, filler, pigment, fire retardant, antioxidant, antistatic agent and combinations thereof;
    wherein (a) and (b) are used at an isocyanate index of from 85 to 115, and
    wherein the first polyol component consists of at least one polyester polyol which does not comprise a hydroxymethyl group as a pendant group and which is obtainable as the reaction product of at least one polycarboxylic acid and at least one alcohol having from about 2 to about 8 hydroxyl groups, and the second polyol component comprises at least one polyester polyol which comprises at least one hydroxymethyl group as a pendant group and at least one other isocyanate reactive material, and the total amount of polyester polyol which comprises at least one hydroxymethyl group as a pendant group used in the second polyol component is at least about 10 and at most about 80 weight percent of the second polyol component.

2. An elastomer obtainable by contacting under reaction conditions:
    (a) an isocyanate component comprising an isocyanate-terminated prepolymer having an isocyanate (NCO) content of 10 to 30 weight percent where the isocyanate-terminated prepolymer consists of the reaction product of a stoichiometric excess of one or more di- or polyisocyanate compounds, collectively referred to hereinafter as isocyanate component, with a first polyol component;
    (b) a second polyol composition referred to hereinafter as second polyol component;
    c) an effective amount of a blowing agent to provide a polyurethane elastomer with a density from 200 to 1200 kg/m³;
    (d) optionally, a chain extender; and (e) optionally, at least one additive selected from the group consisting of a catalyst, surfactant, filler, pigment, fire retardant, antioxidant, antistatic agent and combinations thereof;

wherein (a) and (b) are used at an isocyanate index of from 85 to 115, and wherein the first polyol component consists of at least one polyester polyol which does not comprise a hydroxymethyl group as a pendant group and which is obtainable as the reaction product of at least one polycarboxylic acid and at least one alcohol having from about 2 to about 8 hydroxyl groups, and the second polyol component comprises at least one polyester polyol which comprises at least one hydroxymethyl group as a pendant group and at least one other isocyanate reactive material, and the total amount of polyester polyol which comprises at least one hydroxymethyl group as a pendant group used in the second polyol component is at least about 10 and at most about 80 weight percent of the second polyol component.

3. The elastomer of claim 2 wherein the polyester polyol which comprises at least one hydroxymethyl group as a pendant group is a reaction product of at least one fatty acid or derivative thereof and at least one dicyclohexandimethanol.

4. The elastomer of claim 3 wherein the fatty acid or derivative thereof comprises at least one hydroxymethylated fatty acid methyl ester.

5. The elastomer of claim 3 wherein the fatty acid or derivative thereof comprises soybean oil or a derivative thereof.

6. The elastomer of claim 3 wherein the fatty acid or derivative thereof comprises at least one fatty acid or derivative thereof from at least one vegetable oil comprising fatty acids in natural abundance.

7. The elastomer of claim 2 wherein a chain extender is used and wherein the chain extender has an equivalent weight per isocyanate reactive group of less than 250 Daltons and is present in an amount of at least about 0.5 and at most about 20 parts by weight per 100 parts by weight of the second polyol component.

8. The elastomer of claim 2 wherein said at least one other isocyanate reactive material in the second polyol component comprises at least one crosslinker, having at least 3 isocyanate reactive groups and an equivalent weight of less than about 400; and wherein the crosslinker is present in an amount of at least about 0.1 and at most about 1 part by weight per 100 parts by weight of the second polyol component.

9. The elastomer of claim 2
   (A) having a molded density of about 1.0-1.2 g/cm$^3$, and at least 1 of a tensile strength of at least about 10 MPa; tear strength of at least about 7.0 N/mm; or elongation of preferably at least about 350 percent based on original length in elongation at break;
   (B) having a molded density about 0.45-0.75 g/cm$^3$ and at least 1 of a tensile strength of at least about 3.0 MPa; a tear strength of at least about 4.0 N/mm; or an elongation at break of at least about 300 percent; or
   (C) having a molded density of 0.30-0.45 g/cm$^3$ and at least 1 of a tensile strength of at least about 2.0 0 MPa; a tear strength of at least about 10.0 N/mm; or an elongation at break of at least about 150.

10. The elastomer of claim 9 having a density specified in (A), (B) or (C) and at least 2 of the properties of tensile strength, tear strength or elongation of at least the value specified for that property at the specified density.

11. The elastomer of claim 9 having a density specified in (A), (B) or (C) and having 3 of the properties of tensile strength, tear strength and elongation of at least the value specified for that property at the specified density.

12. An article comprising the elastomer of claim 2.

13. The article of claim 12 wherein the elastomer is in the form of a foam.

14. The article of claim 12 in the form of a microcellular foam.

15. The article of claim 12 which is a shoe sole or a portion of a shoe sole.

16. An article comprising the product of claim 1.

17. The process of claim 1, wherein the polyester polyol which comprises at least one hydroxymethyl group as a pendant group is formed from a hydroxymethylated natural oil or derivative thereof.

* * * * *